(12) United States Patent
Ong et al.

(10) Patent No.: US 11,875,605 B2
(45) Date of Patent: Jan. 16, 2024

(54) USER AUTHENTICATION FOR AN INFORMATION HANDLING SYSTEM USING A SECURED STYLUS

(71) Applicant: Dell Products L.P., Round Rock, TX (US)

(72) Inventors: Chin Leong Ong, Singapore (SG); Gerald Rene Pelissier, Mendham, NJ (US); Hsu Feng Lee, Taipei (TW); Benedict Tiong Chee Tay, Singapore (SG); Yan Yan, Singapore (SG)

(73) Assignee: DELL PRODUCTS L.P., Round Rock, TX (US)

( * ) Notice: Subject to any disclaimer, the term of this patent is extended or adjusted under 35 U.S.C. 154(b) by 52 days.

(21) Appl. No.: 17/175,107

(22) Filed: Feb. 12, 2021

(65) Prior Publication Data

US 2022/0261585 A1 Aug. 18, 2022

(51) Int. Cl.
*G06K 9/62* (2022.01)
*G06V 40/70* (2022.01)
*G06F 21/32* (2013.01)
*H04L 9/32* (2006.01)
*G06F 3/0354* (2013.01)
*G06V 10/40* (2022.01)
*G06V 30/32* (2022.01)
*G06V 40/13* (2022.01)

(Continued)

(52) U.S. Cl.
CPC .......... *G06V 40/70* (2022.01); *G06F 3/03545* (2013.01); *G06F 21/32* (2013.01); *G06V 10/40* (2022.01); *G06V 30/142* (2022.01); *G06V 30/36* (2022.01); *G06V 40/13* (2022.01); *G06V 40/1365* (2022.01); *H04L 9/3213* (2013.01); *H04L 9/3242* (2013.01)

(58) Field of Classification Search
CPC .. G06V 40/12–40/1394; G06V 30/142; G06V 40/70; G06V 30/19–30/387
See application file for complete search history.

(56) References Cited

U.S. PATENT DOCUMENTS

| | | | | |
|---|---|---|---|---|
| 6,307,956 B1 * | 10/2001 | Black | ................... | G06Q 20/341 |
| | | | | 713/186 |
| 2006/0005042 A1 * | 1/2006 | Black | ............... | G06Q 20/40145 |
| | | | | 713/186 |

(Continued)

*Primary Examiner* — Brian Werner
(74) *Attorney, Agent, or Firm* — Norton Rose Fulbright US LLP (57) ABSTRACT

Security on an information handling system may be improved by using a stylus. A stylus provides unique information about a user that may not be acquired by an information handling system through other methods. For example, a user's handwriting is often unique to that user and may provide a security check on the information handling system to confirm the user's identity. Further, the stylus is usually held in the user's hand and may be used to check the user's fingerprint to confirm the user's identity. These authentication techniques, including fingerprinting and handwriting, may be used to maintain persistent authentication while the user is using the stylus. As the user continues to interact with the information handling system with the stylus, the stylus continues to receive the user's fingerprint and handwriting, which may be checked to confirm the user of the information handling system is still the expected user.

14 Claims, 9 Drawing Sheets

(51) Int. Cl.
  *G06V 40/12* (2022.01)
  *G06V 30/142* (2022.01)

(56) References Cited

U.S. PATENT DOCUMENTS

| | | | | |
|---|---|---|---|---|
| 2006/0288234 A1* | 12/2006 | Azar | ............... | G06V 40/172 |
| | | | | 713/186 |
| 2010/0174914 A1* | 7/2010 | Shafir | ............... | G07C 9/37 |
| | | | | 713/186 |
| 2019/0392130 A1* | 12/2019 | Tazuke | ............... | H04N 1/0097 |

* cited by examiner

USER AUTHENTICATION FOR AN INFORMATION HANDLING SYSTEM USING A SECURED STYLUS

FIELD OF THE DISCLOSURE

The instant disclosure relates to information handling systems. More specifically, portions of this disclosure relate to securely identifying users of the information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems have become embedded in users' lives based on their ability to store and process large amounts of different kinds of information. As a result, information handling systems may store confidential and private user information. Further, information handling systems are often connected to multiple services using users' credentials that are stored on the information handling systems. The presence of confidential information and user account information on the information handling system can create security concerns. If a malicious user is able to gain access to the information on the information handling system, the malicious user may be able to interrupt the user's life, steal the user's identity, gain access the user's confidential documents, or more.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

SUMMARY

Security on an information handling system may be improved by using a stylus. A stylus provides unique information about a user that may not be acquired by an information handling system through other methods. For example, a user's handwriting is often unique to that user and may provide a security check on the information handling system to confirm the user's identity. Further, the stylus is usually held in the user's hand and may be used to check the user's fingerprint to confirm the user's identity. These authentication techniques, including fingerprinting and handwriting, may be used to maintain persistent authentication while the user is using the stylus. As the user continues to interact with the information handling system with the stylus, the stylus continues to receive the user's fingerprint and handwriting, which may be checked to confirm the user of the information handling system is still the expected user. For example, if the stylus is used by another user, the information handling system may recognize a different fingerprint and/or handwriting and change the authenticated user to a different use for the information handling system. As another example, a proximity of the stylus with the tablet, such as measured by a wireless connection, may indicate when a user has walked away from the information handling system and indicate to the information handling system that the user should be logged out.

In some embodiments, multiple types of authentication methods using a stylus may be combined to secure the information handling system. For example, a user of the information handling system may be authenticated based on security requirements configured in a security policy for the information handling system. Example authentication methods may include: handwritten password authentication, handwriting biometric recognition, fingerprint biometric recognition, and combinations thereof, including the combination of handwritten password and handwriting biometric recognition, the combination of handwritten password authentication and fingerprint biometric recognition, and the combination of handwritten password authentication, handwriting biometric recognition, and fingerprint biometric recognition.

Embodiments of the authentication methods disclosed herein may be performed on an information handling system with a wireless connection to a stylus. The stylus may include a short-range wireless communication module for communicating with the information handling system. The stylus may also include fingerprint sensing capability and/or the ability to perform Match On Chip (MOC) authentication, in which the stylus can match a user's fingerprint to a registered fingerprint to generate a fingerprint token that is transmitted to and verified by the information handling system to authenticate the user. The information handling system may include support for a secure operating system (OS) and/or a Trusted Execution Environment (TEE), an in-device digital ink recognition engine to perform handwriting-to-text translation, an in-device handwriting biometric recognition engine running in a secure OS to validate user handwriting biometric, a security service executing on the information handling system to manage a security level and perform persistent/periodic user validation by triggering fingerprint authentication on pen and receiving and passing on the authentication token to the secure OS for validation, and/or an authentication module (e.g., a gatekeeper) executing in the secure OS to validate user credentials according to a current security profile or level.

In one example, a user may be authenticated through a write-to-login method using optical character recognition (OCR), in which a user uses the information handling system and stylus for note taking. The user may obtain a convenient way to login to the information handling system by setting a password to 27h13a, and instead of entering the password via a keyboard or soft keyboard on a device, the user can scribbles 27h13a on the information handling system to unlock the device. The stylus stroke can remain on the display for only a fraction of time so that others not able to peep at the entire string of the password.

In another example, two-factor authentication combines OCR and handwriting biometric recognition allows a user to handle sensitive documents. The user may scribble a string of password on the device to login and use the information handling system to record important notes during confidential meetings. The system recognizes the user's handwriting biometrics, which serves as another layer of enhanced security to unlock the device. Even if another individual knows the user's password, the user's attempt to access the system will be denied because the system can recognize different handwriting biometrics.

In a further example, two-factor authentication combines OCR and fingerprint recognition may be specified in a security policy of the information handling system specifying two authentications for access to the system by a certain user or access to certain content on the system. While the user is using the system and writing the password to login, the stylus recognizes fingerprints and logs in the user using one, two, three, or more fingers for authentication. A malicious user's login attempt would fail even if the malicious user knows the password and mimics the user's handwriting because the fingerprint recognition detects an unmatched fingerprint on the stylus during login.

In another example, three-factor authentication combines OCR, handwriting biometric recognition, and fingerprint recognition in which the security policy of the information handling system specifies three authentications for access to the system by a certain user or access to certain content on the system. While the user is using the system and writing the password to login, the fingerprint recognition on the stylus recognizes fingerprints and logs in the user based on one, two, three, or more fingers and based on handwriting biometrics.

In a further example, persistent authentication may be performed alone or in combination with one of the one-factor, two-factor, or three-factor authentication techniques described above. The persistent authentication may include periodic sampling of a fingerprint in which after the user logs in to the system, the system continues to recognize handwriting and/or recognize fingerprints for authentication as the user writes. If the user leaves the system and stylus behind and another user picks up the paper and stylus and starts writing, the stylus may detect a different fingerprint and/or different handwriting biometrics and enforce a reauthentication process for access to the system and/or content.

According to one embodiment, a method may include receiving a request to access content at an information handling system; receiving user handwriting input at the information handling system from a user, wherein the user handwriting input comprises a user password; and/or determining whether to approve the request to access content based, at least in part, on the user handwriting input. The determination may include recognizing text in the user handwriting input; and/or determining whether the user password of the recognized text authenticates the user.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

According to another embodiment, a system may include a stylus and an information handling system. The stylus may include a wireless communication module; a memory; a fingerprint sensor; and/or a processor coupled to the fingerprint sensor, the memory, and the wireless communication module. The processor of the stylus may be configured to perform operations that carry out steps comprising receiving a fingerprint measurement from the fingerprint sensor; generating a fingerprint token based on a match of the fingerprint measurement to a stored fingerprint in the memory; transmitting the fingerprint token to another device through the wireless communication module; and/or other operations described in embodiments of this disclosure. The information handling system may include a wireless communication module; a memory; and/or a processor coupled to the memory and to the wireless communication module. The processor of the information handling system may be configured to perform operations that carry out steps comprising coupling to the stylus of a user through the wireless communication module; receiving a fingerprint token from the stylus; authenticating the user for access to the information handling system based on the fingerprint token; and/or other operations described in embodiments of this disclosure.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
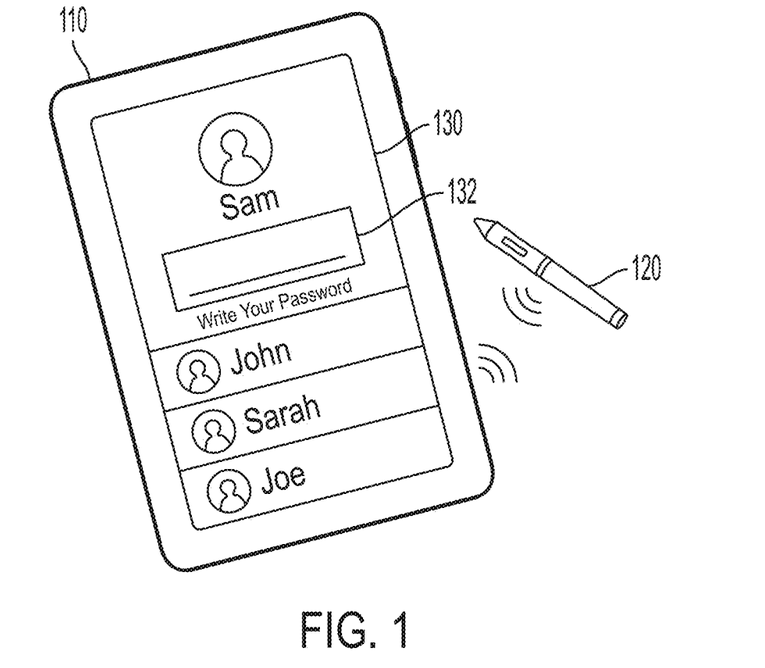
FIG. 1 is an illustration showing an example user authentication to an information handling system with a wireless stylus according to some embodiments of the disclosure.

FIG. 1 is an illustration showing an example user authentication to an information handling system with a wireless stylus according to some embodiments of the disclosure. An information handling system 110 may include a display 130 for interacting with a user of the information handling system. The system 110 may communicate wirelessly with a stylus 120 to receive user input from the user, such as requests to access content, requests to access the system 110, handwriting input, fingerprint input, gestures, or other user input. When a user attempts to access the system 110 the user may be presented with a box 132 to write a password. The user may write their password with the stylus 120, instead of or in addition to typing a password on a physical or virtual keyboard of the system 110. The box 132 may be presented anytime a user attempts to access the system 110 or content through the system 110 that a security profile for the system 110 requires authentication. For example, a user may be provided some limited access to the system 110 initially, but when certain content or system features are requested, the user is prompted by box 132 to authenticate.

Figure 2:
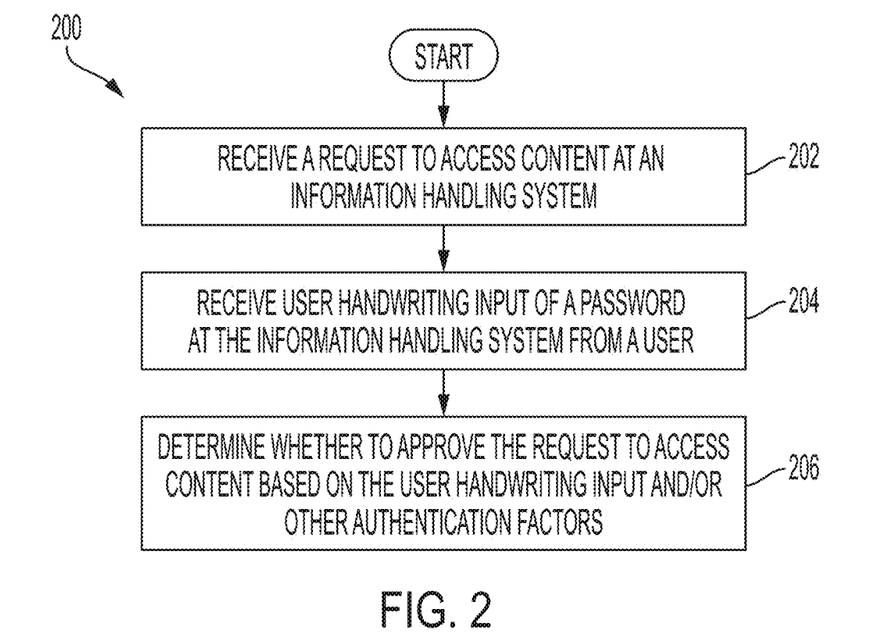
FIG. 2 is a flow chart illustrating an example method for authenticating a user of an information handling system with a wireless stylus according to some embodiments of the disclosure.

Authentication of a user to the system 110 using the stylus 120 may be performed in one example according to the method shown in FIG. 2. FIG. 2 is a flow chart illustrating an example method for authenticating a user of an information handling system with a wireless stylus according to some embodiments of the disclosure. A method 200 begins at block 202 with receiving a request to access content at an information handling system by a user. The request to access content may include, for example, a request to unlock the system, a request to access a particular file on the system, a request to access a particular feature on the system, a request to access a particular application on the system, or another request that requires authentication, such as may be specified by a security profile for the system. In some embodiments, the security profile may be received locally from an administrator of the system. In some embodiments, the security profile may be set through a server responsible for managing the system.

At block 204, user handwriting input of a password is received in response to the request of block 202. A password may include a combination of letters, numbers, symbols, or other characters as part of a passphrase or PIN.

At block 206, the system determines whether to approve the request received at block 202 based on the user handwriting input of block 204 and/or other authentication factors. For example, the system may perform handwriting biometric analysis on the received user handwriting input of block 204 to uniquely identify a user's handwriting and thus determine who the user is, compare that user with a security profile, and determine whether the user should be granted or denied access to the requested content of block 202. In addition to biometrics analysis, characters in the user handwriting input may be recognized and used to determine if the entered password matches the user's password. Still other authentication techniques that may be combined with the user handwriting input may include fingerprint recognition. Different users of the system may have different security levels. For example, some users may be in an "admin" group, some users may be in a "power users" group, and other users may be in a "users" group. Each higher level group may have access to more content. For example, "admin" users may have access to all content, whereas "power users" and "users" groups have access to fewer and fewer content, respectively. In some embodiments, users may have specific content available only to particular users. For example, a user may have a "home" directory that only that user is authorized to access, and access to that directory is not dependent on the user's security level. In some embodiments, the security level for a user may also be based on context, such as a location of the information handling system. The system may have stricter authentication requirements when the system is in a public space than at the user's home location.

Figure 3:
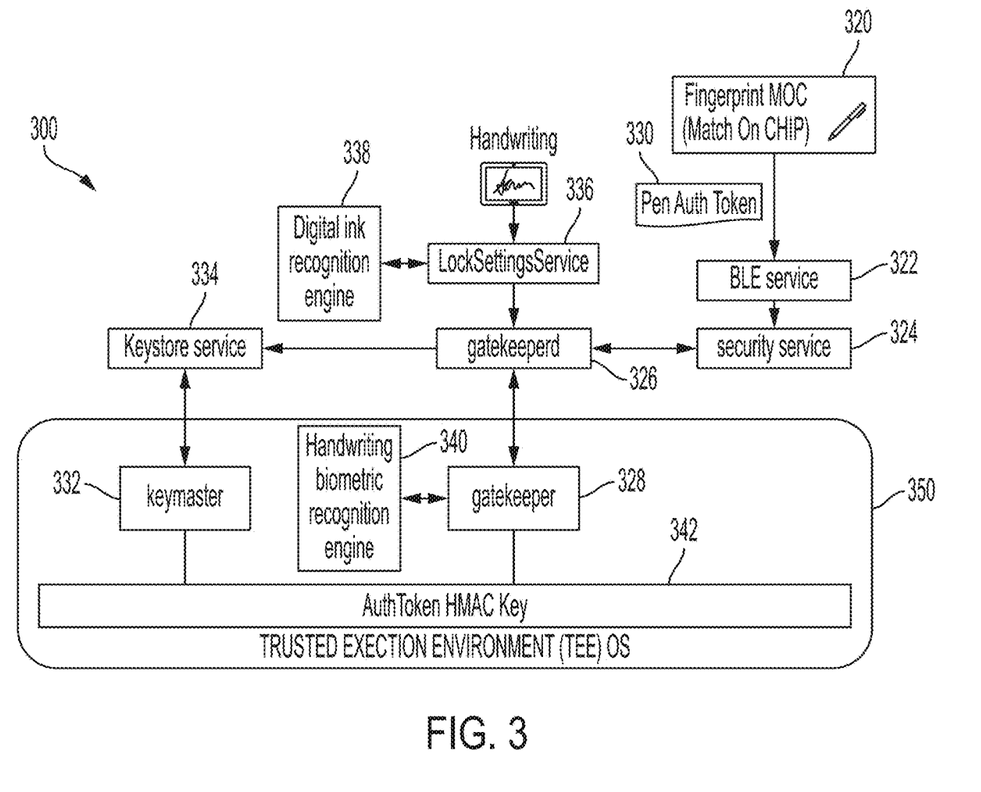
FIG. 3 is a block diagram illustrating example operations executing on an information handling system for authenticating a user of the information handling system with a wireless stylus according to some embodiments of the disclosure.

FIG. 3 is a block diagram illustrating example operations executing on an information handling system for authenticating a user of the information handling system with a wireless stylus according to some embodiments of the disclosure. A system 300 may include a stylus 320, which may have match-on-chip (MOC) capability. For example, the stylus 320 may have a secure storage area for storing representations of enrolled fingerprints, which may be the fingerprints themselves or values, such as hash values, computed from fingerprints. A secure processor with access to the secure storage area may be able to generate a fingerprint token 330 when a fingerprint sensor of the stylus 320 matches an enrolled fingerprint. The token 330 may be transmitted wirelessly to an information handling system.

The information handling system may have a communications service 322 to receive the token 330 and pass the token to a security service 324 for checking the authenticity of the token 330. For example, generation of the token 330 may be based, at least in part, on a certificate installed in the secure storage area of the stylus 320. The security service 324 may use a corresponding certificate to authenticate that the token 330 was generated by a secure stylus. The security service 324 then passes information to a gatekeeper daemon service 326.

The gatekeeper daemon service 326 may also receive handwriting from the user, such as through a lock settings service 336. The lock settings service 336 may process requests to access content on the system, such as a request to unlock the system from a locked state. The lock settings service 336 may receive the user handwriting input, which may be a password, and use digital ink recognition engine 338 to recognize characters in the handwriting input, and pass the user handwriting input and/or input password to the gatekeeper daemon service 326.

The gatekeeper daemon service may have a counterpart gatekeeper service 328 executing within a trusted execution environment (TEE) operating system (OS) 350. The TEE OS 350 may execute on a processor shared with other services, such as services 322, 324, 326, 334, and/or 336, but be isolated from other services to protect execution from malicious attacks. The TEE OS 350 may provide security features such as isolated execution, integrity of applications executing with the TEE, along with confidentiality of their assets. Within the TEE OS 350, the gatekeeper service 328 may receive the user handwriting input and analyze the handwriting using a handwriting biometric recognition engine 340. The engine 340 may analyze the user handwriting input, such as stroke length, applied pressure, stroke speed, and shapes and sequence of strokes used to form characters within the user handwriting input. The gatekeeper service 328 may share a hash-based message authentication code (HMAC) key 342 with a keymaster service 332. In one embodiment, an internal inter-process communication (IPC) system is used to communicate a shared secret directly between the keymaster service 332 and the gatekeeper service 328. This shared secret is used for signing tokens sent to a keystore to provide attestations of password verification. The gatekeeper service 328 may request the key from the keymaster service 332 for each use and not persist in a cache. Although several authentication techniques are illustrated in FIG. 3, the system may be configured to include or use one, two, three, or more factors for authenticating a user.

Figure 4:
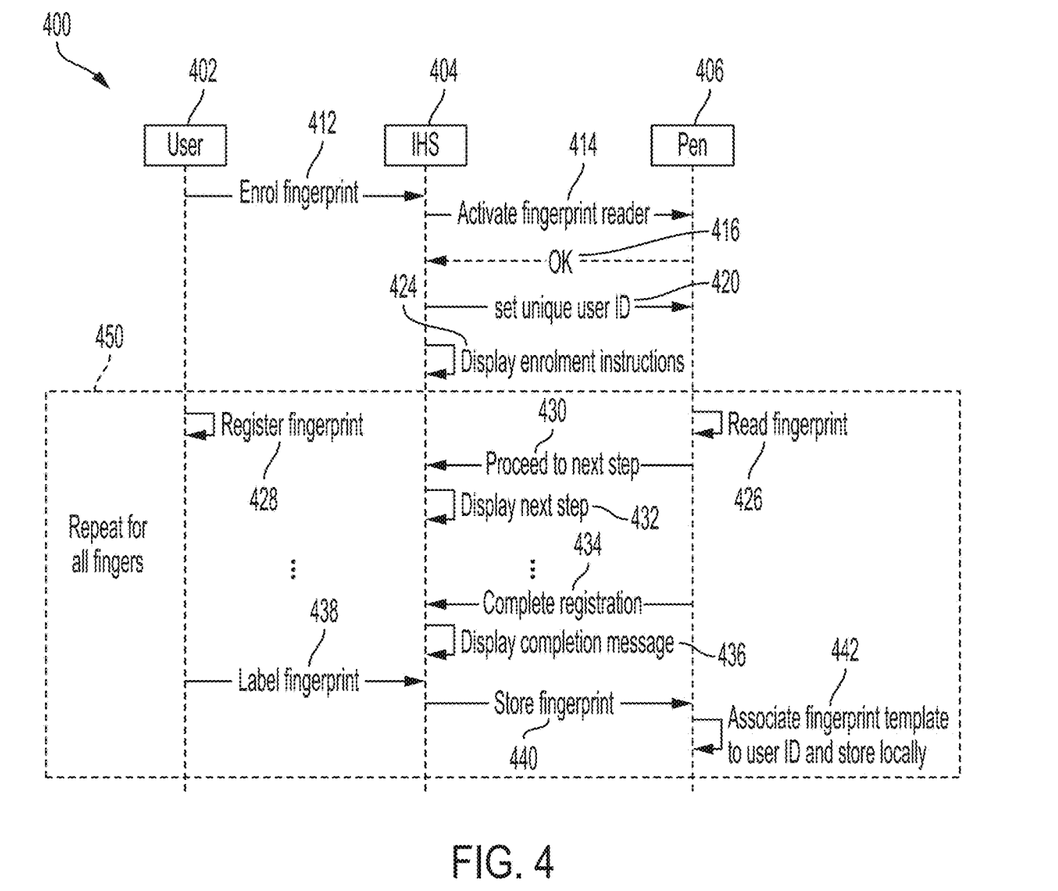
FIG. 4 is a call flow diagram illustrating example operations for registering a user of the information handling system for authenticating the user of the information handling system with a wireless stylus according to some embodiments of the disclosure.

When the stylus supports fingerprint recognition, a user may be enrolled according to the method of FIG. 4. FIG. 4 is a call flow diagram illustrating example operations for registering a user of the information handling system for authenticating the user of the information handling system with a wireless stylus according to some embodiments of the disclosure. A method 400 includes a user 402 request at call 412 to enroll a fingerprint with the information handling system 404 through a detector in the stylus 406. The IHS 404 activates a fingerprint reader of the stylus 406 at call 414, which the stylus 406 acknowledges at call 416. At call 420, the IHS 404 sends a user ID for the user requested enrollment at call 420 and displays enrollment instructions to the user at call 424, such as to place one, two, three, or more fingerprints in a particular orientation on a fingerprint sensor on the stylus 406. The user places a finger on the fingerprint detector to register a fingerprint at call 428, and the stylus 406 reads the fingerprint at call 426. When the fingerprint is successfully read, the stylus 406 indicates readiness to proceed to the next step at call 430, causing the IHS 404 to display instructions for the next step at call 432. Registration may be completed in the stylus 406 at call 434, and the IHS 404 display a completion message to the user at call 436. The user may label the fingerprint at call 438, such as "right index finger" or "left ring finger" at call 438. The IHS 404 instructs the stylus 406 to store the fingerprint at call 440, such as in a secure storage area of the stylus 406. The stylus 306 may associate a fingerprint template with the unique userID of call 420 and store the information regarding the fingerprint and association in the stylus 406. The processes corresponding to calls 426, 428, 430, 432, 434, 436, 438, 440, and 442 may be repeated for additional fingers of the user, and additional users with access to the stylus 406.

Figure 5:
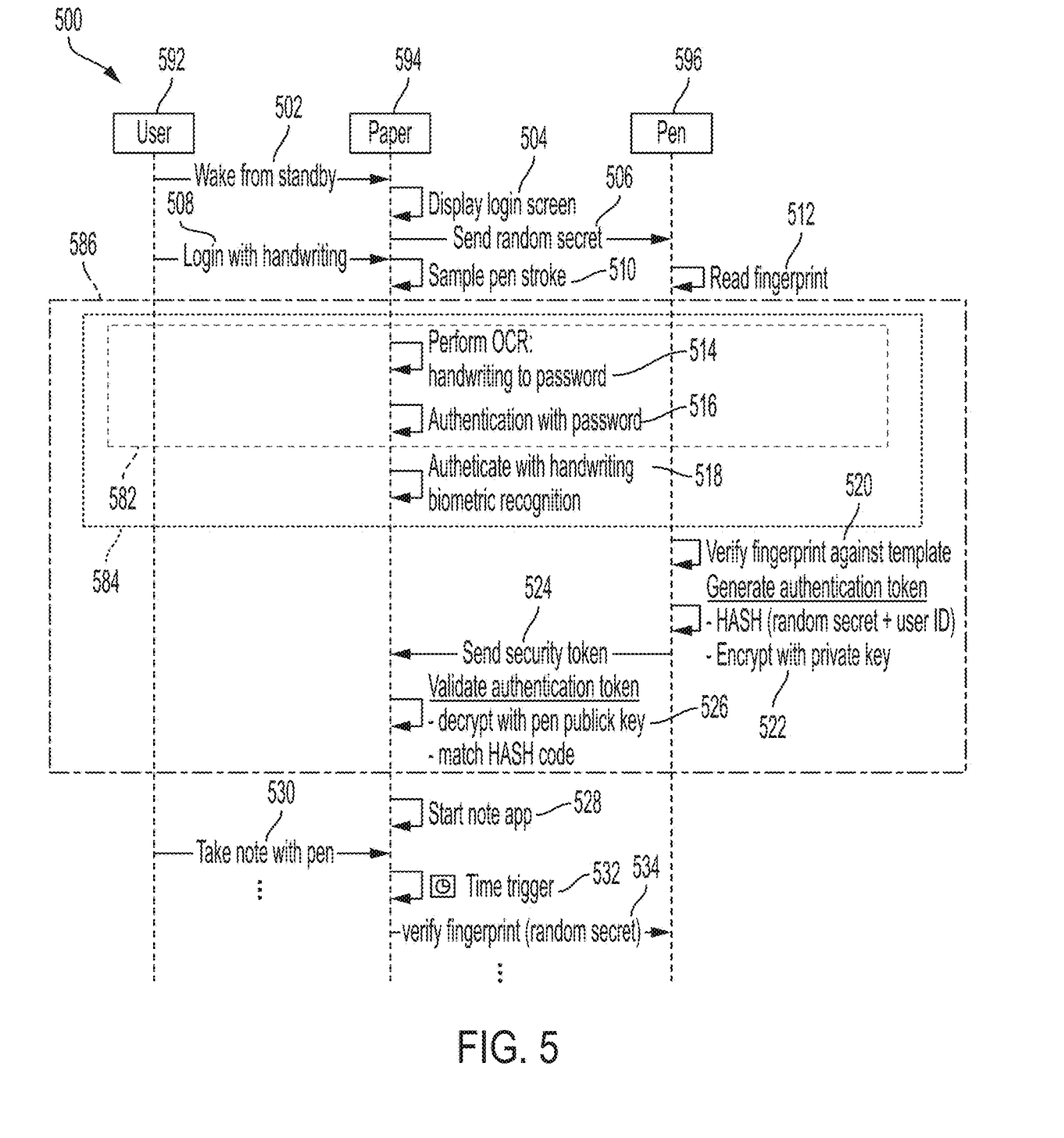
FIG. 5 is a call flow diagram illustrating example operations for authenticating a user of the information handling system with a wireless stylus according to some embodiments of the disclosure.

A user may be authenticated through one or more authentication techniques based on the example authentication process illustrated in FIG. 5. FIG. 5 is a call flow diagram illustrating example operations for authenticating a user of the information handling system with a wireless stylus according to some embodiments of the disclosure. A user 592 may wake (e.g., exit) an information handling system 594 from standby, such as by tapping the IHS 594 with a stylus 596, tapping a touch screen of the IHS 594, or pressing a power button of the IHS 594. At call 504, the IHS 594 displays a login screen or other prompt requesting authentication of the user. The IHS 504 sends a random secret over a wireless communication connection at call 506 to the stylus 596. The user 592 logs in with a handwriting input at call 508, the IHS 594 samples the pen strokes at call 510, and the stylus 596 reads the user's fingerprint during the strokes.

One or more authentication factors may be checked following the input of calls 508, 510, and 512. In a first authentication factor 582, the IHS 504 performs OCR on the user's handwriting to obtain characters of a password at call 514, and the password may be authenticated by the IHS 594 at call 516. In a second authentication factor 584, the IHS 594 authenticates the user with handwriting biometric recognition at call 518 based on the user handwriting input received at call 508 received as strokes 510. In a third authentication factor 586, the stylus 596 verifies at call 520 a fingerprint of the user against a fingerprint template previously enrolled with the stylus 596 and generates an authentication token at call 522. The token may include a representation that the fingerprint is authenticated by computing a hash of a combination of the random secret sent at call 506 and the userID corresponding to the verified fingerprint of call 520. That hash value may be encrypted with a private key stored on the stylus 596 and the token transmitted at call 524 to the IHS 594. The IHS 594 may validate the token at call 526, such as by decrypting the hash value with a public key stored at the IHS 594 and matching the hash value to an expected hash value for a user. The authentication techniques of 582, 584, and 586 may be used separately or in various combinations among themselves or with other authentication techniques. After one or more authentications at call 516, 518, and/or 526, the IHS 594 may permit access to the content of the IHS 594, such as by starting a notes application at call 528. The user 592 may subsequently take notes with the stylus at call 530 or perform other tasks with the IHS 594. After certain criteria, such as a time trigger at call 532, the IHS 594 may request verification of the user, such as by reauthenticating the user's fingerprint.

Figure 6:
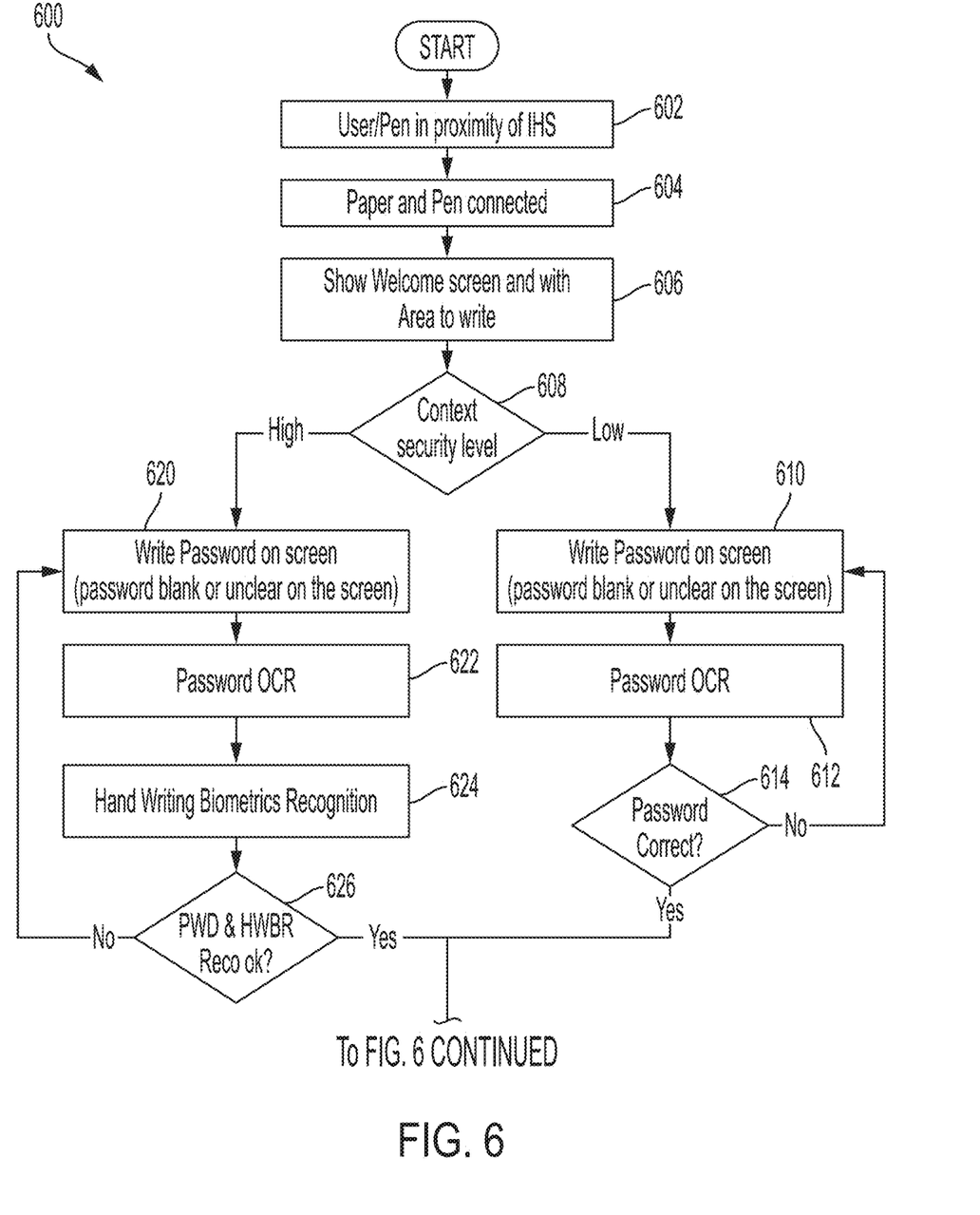
FIG. 6 is a flow chart illustrating an example method for operating an information handling system to authenticate a user with a wireless stylus according to some embodiments of the disclosure.

A method FIG. 6 is a flow chart illustrating an example method for operating an information handling system to authenticate a user with a wireless stylus according to some embodiments of the disclosure. A method 600 begins at block 602 with a user and their stylus entering close proximity with an information handling system. Close proximity may refer to a distance at which short-range communications, such as through BLUETOOTH. After entering into proximity, the IHS and the stylus may be connected at block 604. The IHS, at block 606, may then show a welcome screen with an area to write, such as to write a password.

At block 608, the IHS determines a context security level. If the security level is low, then the user is requested to write a password at block 610. OCR is performed on the password at block 612, and it is determined whether the password is correct at block 614. If not, the user is requested to re-enter the password at block 610. If the password matches at block 614, the method 600 continues to block 630 to unlock the IHS or otherwise grant access to content on the IHS or a remote device. If the security level is high, then the user is requested to write a password at block 620. OCR is performed on the password at block 622, and handwriting biometrics recognition is performed at block 624. If the password and biometrics are not matched at block 626, the user is again requested to write the password at block 620. If the password and biometrics are matched at block 626, the method 600 continues to block 630 to unlock the IHS or otherwise grant access to content on the IHS or a remote device.

In some embodiments, the authentication may have criteria that cause expiration of the access to the content or the IHS. For example, at block 632, the IHS may be configured with persistent authentication and/or proximity checks. At block 634, the IHS determines whether the user has left the IHS by determining whether the stylus is out of range of the IHS and/or whether the fingerprint on the stylus no longer matches the authenticated user. If the user remains in proximity and using the stylus, the method 600 continues back to block 630 to keep the IHS unlocked and continue to perform persistent authentication checks. When the user leaves the IHS at block 634, then the IHS is locked or access to the content removed at block 636.

A timer determines at block 638 whether a predetermined amount of time, such as N minutes, is exceeded. If the user returns to proximity with the IHS and contacts the IHS with a stylus at block 640, the user may be allowed to be re-authenticated through a shorter process. For example, the IHS may determine at block 642 whether the same pen landed on the IHS. If so, the IHS may unlock at block 644 without further authentication, or with another limited authentication with fewer factors than originally used to unlock the IHS. If the user returns with a different pen at block 642, then the IHS logs the user out at block 646. If the timer at block 638 is exceeded, then the IHS logs the user out at block 646.

Figure 7:
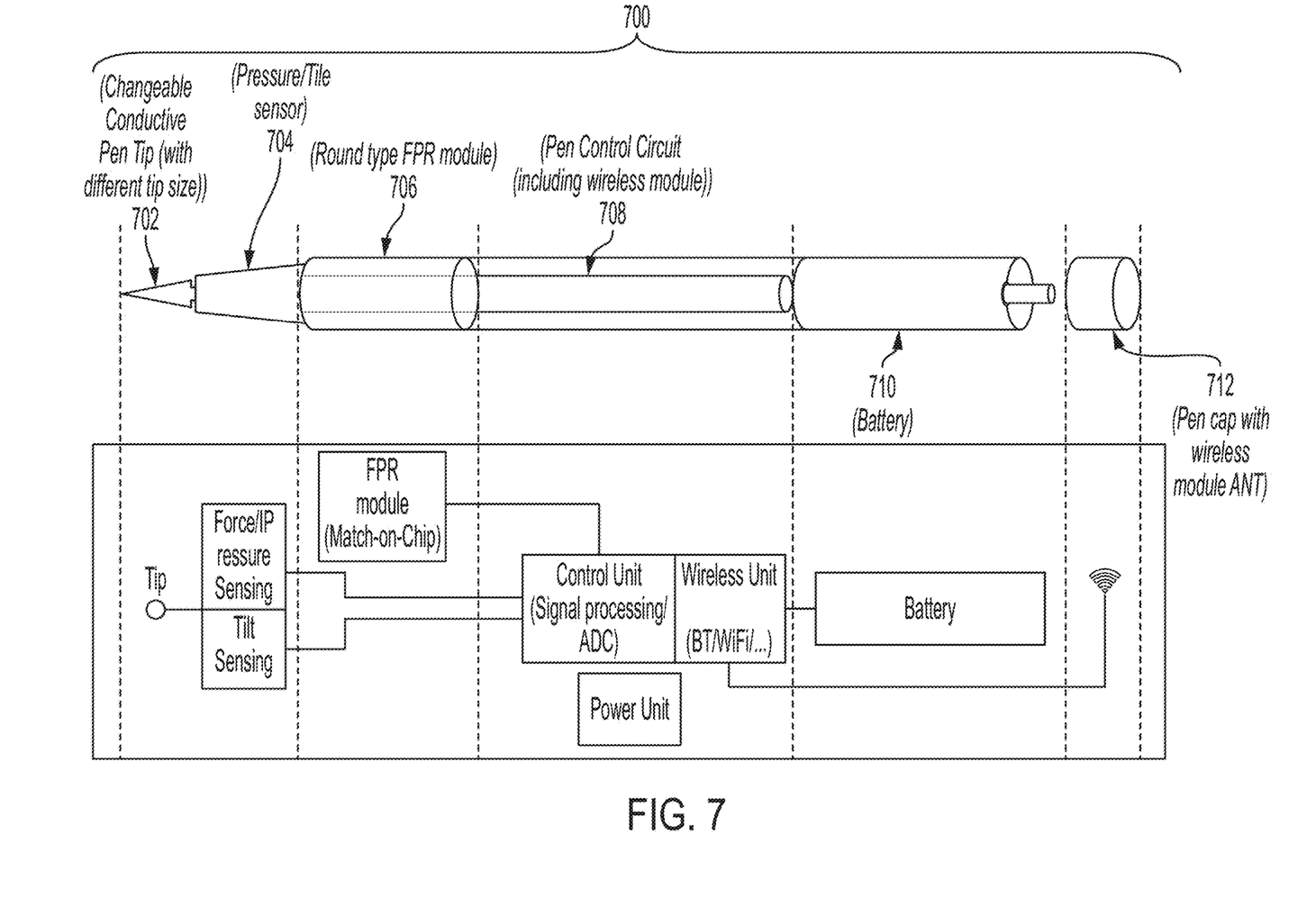
FIG. 7 is a block diagram illustrating an example wireless stylus for authenticating a user with an information handling system according to some embodiments of the disclosure.

One embodiment of a stylus for authenticating a user according to some of the disclosed embodiments is shown in FIG. 7. FIG. 7 is a block diagram illustrating an example wireless stylus for authenticating a user with an information handling system according to some embodiments of the disclosure. A stylus 700 may include a changeable conductive pen tip 702, a pressure sensor 704, a fingerprint recognition (FPR) module 706, a pen control circuit 708 (including, for example, a processor, a secure storage unit, and/or a wireless communication module), a battery 710, and/or a pen cap with a wireless antenna module 712. The FPR module 706 may include a round-type FPR module that can recognize one, two, three, or more fingerprints simultaneously during holding of the stylus 770. In some embodiments, the FPR module 706 may include a match-on-chip (MOC) sensor, in which the fingerprint matching is performed on the stylus 700. The pressure sensor 704 may include a pressure sensor to detect pen writing force and/or tilt sensors to detect a pen tilt angle, and the pressure and/or tilt angle communicated to the information handling system.

Figure 8:
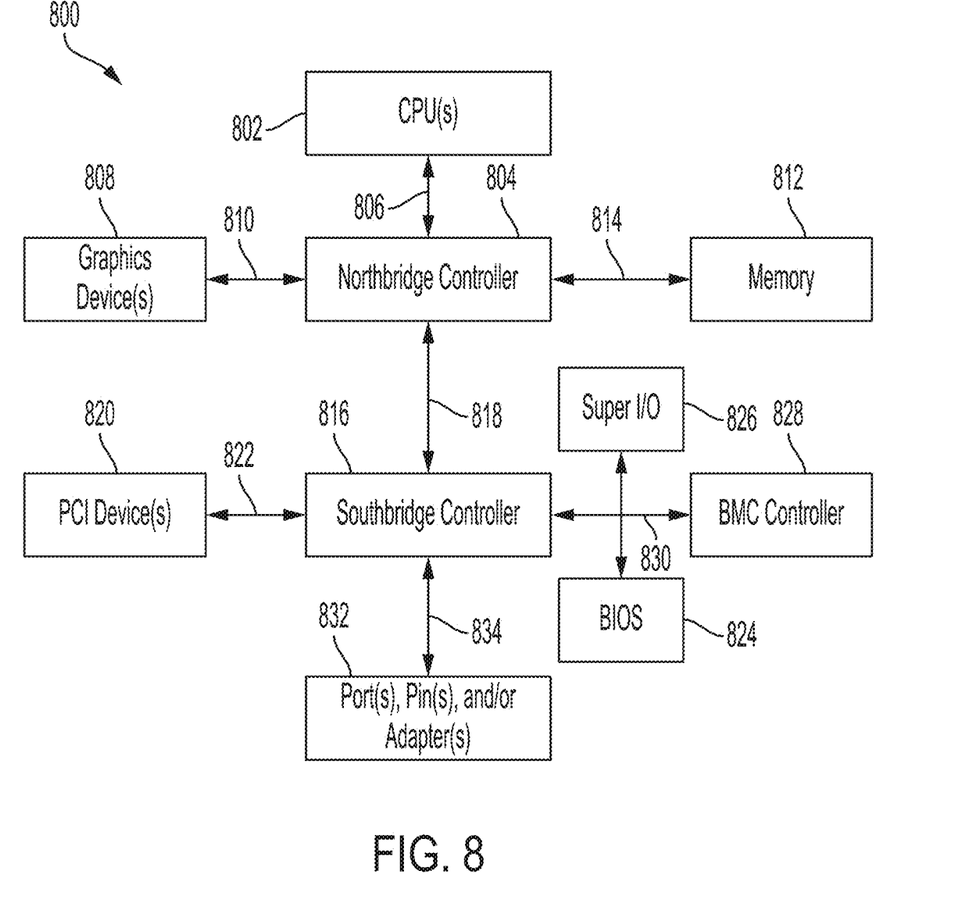
FIG. 8 is a schematic block diagram of an example information handling system according to some embodiments of the disclosure.
Figure 9:
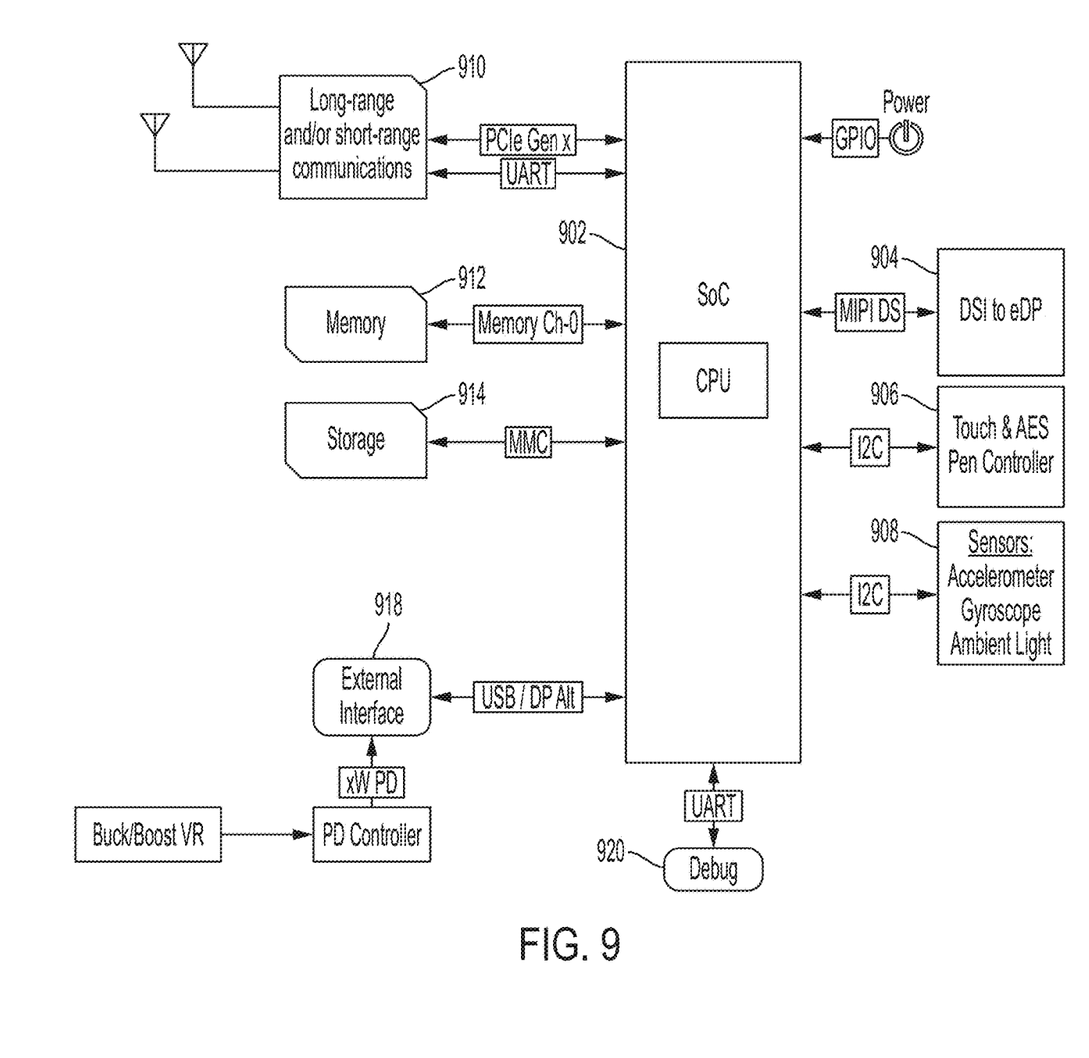
FIG. 9 is a schematic block diagram of an example information handling system for mobile computing according to some embodiments of the disclosure.

One example embodiment of the generic information handling system illustrated in FIG. 8 is shown in FIG. 9. FIG. 9 may be a mobile device, such as a mobile phone or tablet computing device, with computing tasks controlled, at least in part, by a system on chip (SoC). For example, SoC 902 may include an application processor (AP) comprising a central processing unit (CPU). The SoC 902 may also include other logic functionality including an audio processor, a video processor, a digital signal processor. Logic circuitry of the SoC 902 may read and write data stored in memory 912, which may be a volatile memory accessed through a memory channel interface. In some embodiments, the memory 902 and associated circuitry may be integrated in the SoC 902. The SoC 902 may also read and write data stored in storage 914, which may be a non-volatile memory accessed through an interface, such as a MultiMediaCard (MMC), Serial ATA, USB, and/or PCI Express interface. In some embodiments, the storage 914 and associated circuitry may be integrated in the SoC 902.

The SoC 902 may communicate through wired or wireless connections with other devices. For example, a long-range and/or short-range communication module 910 may provide wireless communications for the SoC 902 through one or more of a PCI Express or universal asynchronous receiver-transmitter (UART) interface. Example long-range communications include communications techniques that extend beyond 10 feet, beyond 30 feet, beyond 50 feet, or beyond 100 feet, such as 802.11a, 802.11b, 802.11g, 802.11n. Example short-range communications include communication techniques that do not extend beyond 10 feet, beyond 30 feet, beyond 50 feet, or beyond 100 feet, such as Bluetooth. A wired external interface 918 for communication may provide data communications and/or power. For example, the external interface 918 may be a Type-C USB port with Power Delivery capability that receives power from an external buck/boost voltage regulator. In some embodiments, the external interface 918 is integrated into the SoC 902.

The SoC 902 may also include interfaces to other components. For example, the SoC 902 may provide an output to a display through a display serial interface (DSI) and/or embedded display port (eDP) 904. As another example, the SoC 902 may receive input from a touch screen interface or a stylus controller through an Inter-Integrated Circuit (I2C) interface 906. As a further example, the SoC 902 may receive input from sensors 908 through an I2C interface, including information from an accelerometer, gyroscope, and/or ambient light sensor. Any of the interfaces 904, 906, and/or 908 may likewise be integrated in the SoC 902. In some embodiments, an external debug interface 920 may be provided through a UART interface.

These example embodiments describe and illustrate various authentication techniques for authenticating access to a system or content on an information handling system, such as using a stylus. For example, referring to the information handling system of FIG. 9, the SoC 902 may receive stylus input through interface 906, perform authentication using the handwriting on the CPU, and generate response prompts indicating successful or unsuccessful authentication through the display interface 904. For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

An information handling system may include a variety of components to generate, process, display, manipulate, transmit, and receive information. One example of an information handling system 800 is shown in FIG. 8. IHS 800 may include one or more central processing units (CPUs) 802. In some embodiments, IHS 800 may be a single-processor system with a single CPU 802, while in other embodiments IHS 800 may be a multi-processor system including two or more CPUs 802 (e.g., two, four, eight, or any other suitable number). CPU(s) 802 may include any processor capable of executing program instructions. For example, CPU(s) 802 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 802 may commonly, but not necessarily, implement the same ISA.

CPU(s) 802 may be coupled to northbridge controller or chipset 804 via front-side bus 806. The front-side bus 806 may include multiple data links arranged in a set or bus configuration. Northbridge controller 804 may be configured to coordinate I/O traffic between CPU(s) 802 and other components. For example, northbridge controller 804 may be coupled to graphics device(s) 808 (e.g., one or more video cards or adaptors, etc.) via graphics bus 810 (e.g., an Accelerated Graphics Port or AGP bus, a Peripheral Component Interconnect or PCI bus, etc.). Northbridge controller 804 may also be coupled to system memory 812 via memory bus 814. Memory 812 may be configured to store program instructions and/or data accessible by CPU(s) 802. In various embodiments, memory 812 may be implemented using any suitable memory technology, such as static RAM (SRAM), synchronous dynamic RAM (SDRAM), nonvolatile/Flash-type memory, or any other type of memory.

Northbridge controller 804 may be coupled to southbridge controller or chipset 816 via internal bus 818. Generally, southbridge controller 816 may be configured to handle various of IHS 800's I/O operations, and it may provide interfaces such as, for instance, Universal Serial Bus (USB), audio, serial, parallel, Ethernet, etc., via port(s), pin(s), and/or adapter(s) 832 over bus 834. For example, southbridge controller 816 may be configured to allow data to be exchanged between IHS 800 and other devices, such as other IHS s attached to a network. In various embodiments, southbridge controller 816 may support communication via wired or wireless data networks, such as any via suitable type of Ethernet network, via telecommunications/telephony networks such as analog voice networks or digital fiber communications networks, via storage area networks such as Fiber Channel SANs, or via any other suitable type of network and/or protocol.

Southbridge controller 816 may also enable connection to one or more keyboards, keypads, touch screens, scanning devices, voice or optical recognition devices, or any other devices suitable for entering or retrieving data. Multiple I/O devices may be present in IHS 800. In some embodiments, I/O devices may be separate from IHS 800 and may interact with IHS 800 through a wired or wireless connection. As shown, southbridge controller 816 may be further coupled to one or more PCI devices 820 (e.g., modems, network cards, sound cards, video cards, etc.) via PCI bus 822. Southbridge controller 816 may also be coupled to Basic I/O System (BIOS) 824, Super I/O Controller 826, and Baseboard Management Controller (BMC) 828 via Low Pin Count (LPC) bus 830.

IHS 800 may be configured to access different types of computer-accessible media separate from memory 812. Generally speaking, a computer-accessible medium may include any tangible, non-transitory storage media or memory media such as electronic, magnetic, or optical media, including a magnetic disk, a hard drive, a CD/DVD-ROM, and/or a Flash memory. Such mediums may be coupled to IHS 800 through various interfaces, such as universal serial bus (USB) interfaces, via northbridge controller 804 and/or southbridge controller 816. Some such mediums may be coupled to the IHS through a Super I/O Controller 826 combines interfaces for a variety of lower bandwidth or low data rate devices. Those devices may include, for example, floppy disks, parallel ports, keyboard and mouse and other user input devices, temperature sensors, and/or fan speed monitoring.

BIOS 824 may include non-volatile memory having program instructions stored thereon. The instructions stored on the BIOS 824 may be usable by CPU(s) 802 to initialize and test other hardware components. The BIOS 824 may further include instructions to load an Operating System (OS) for execution by CPU(s) 802 to provide a user interface for the IHS 800, with such loading occurring during a pre-boot stage. In some embodiments, firmware execution facilitated by the BIOS 824 may include execution of program code that is compatible with the Unified Extensible Firmware Interface (UEFI) specification, although other types of firmware may be used.

BMC controller 828 may include non-volatile memory having program instructions stored thereon that are usable by CPU(s) 802 to enable remote management of IHS 800. For example, BMC controller 828 may enable a user to discover, configure, and/or manage BMC controller 828. Further, the BMC controller 828 may allow a user to setup configuration options, resolve and administer hardware or software problems, etc. Additionally or alternatively, BMC controller 828 may include one or more firmware volumes, each volume having one or more firmware files used by the BIOS firmware interface to initialize and test components of IHS 800.

One or more of the devices or components shown in FIG. 8 may be absent, or one or more other components may be added. Further, in some embodiments, components may be combined onto a shared circuit board and/or implemented as a single integrated circuit (IC) with a shared semiconductor substrate. For example, northbridge controller 804 may be combined with southbridge controller 816, and/or be at least partially incorporated into CPU(s) 802. Accordingly, systems and methods described herein may be implemented or executed with other computer system configurations. In some cases, various elements shown in FIG. 8 may be mounted on a motherboard and enclosed within a chassis of the IHS 800.

The schematic flow chart diagrams of FIG. 2 FIG. 4, FIG. 5, and FIG. 6 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above as performed by a processor may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wired connections or through programming by instructions contained in firmware. Further, the logic circuitry may be configured as a general-purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving a request to access content at an information handling system by a user;
   receiving a first user handwriting input at the information handling system from the user, wherein the first user handwriting input comprises a user password;
   receiving a fingerprint token from a wireless stylus coupled to the information handling system and used to enter the first user handwriting input;
   determining whether to approve the request to access content based, at least in part, by:
      determining whether the fingerprint token matches the user;
      recognizing text in the first user handwriting input, wherein the text comprises the user password; and
      determining whether the user password matches the user; and
   performing persistent authentication checks upon determining that the request to access content is approved, wherein the performing persistent authentication checks comprises periodic sampling of the user's fingerprint and determining second handwriting biometrics based on a second user handwriting input, wherein the second user handwriting input does not comprise the user password.

2. The method of claim 1, wherein the step of determining whether to approve the request to access content further comprises:
   determining first handwriting biometrics based on the first user handwriting input; and
   determining whether the first handwriting biometrics authenticates the user.

3. The method of claim 1, wherein the step of determining whether to approve the request to access content further comprises:
   determining first handwriting biometrics based on the first user handwriting input; and
   determining whether the first handwriting biometrics authenticates the user, wherein the request to access content is approved when each of the user password, the first handwriting biometrics, and the fingerprint token authenticates the user.

4. The method of claim 3, wherein determining whether the fingerprint token matches the user comprises:
decrypting the fingerprint token with a public key to obtain a hash value; and
determining whether the hash value matches an expected hash value for the user,
wherein the hash value is based, at least in part, on a random secret and an identification value for the user,
and wherein the method further comprises transmitting to the stylus the random secret prior to receiving the first user handwriting input.

5. The method of claim 1, further comprising:
approving the request to access content based, at least in part, on determining whether the user password of the recognized text authenticates the user; and
after approving the request, determining whether to terminate the access based on at least one of:
receiving a fingerprint token from a wireless stylus coupled to the information handling system during access to the information handling system that does not match the user; or
determining the second handwriting biometrics does not match the user.

6. The method of claim 1, further comprising enrolling the user prior to receiving the request to access content at an information handling system, wherein enrolling the user comprises at least one of:
receiving a fingerprint token corresponding to the user; or
determining handwriting biometrics for the user based on a handwriting sample from the user.

7. The method of claim 1, wherein receiving a request to access content at an information handling system comprises receiving a request to exit the information handling system from a standby mode.

8. An information handling system, comprising:
a memory;
a processor coupled to the memory, wherein the processor is configured to perform steps comprising:
receiving a request for a user to access content;
receiving a first user handwriting input from the user, wherein the first user handwriting input comprises a user password;
receiving a fingerprint token from a wireless stylus coupled to the information handling system and used to enter the first user handwriting input;
determining whether to approve the request for the user to access content based, at least in part, by:
determining whether the fingerprint token matches the user;
recognizing text in the first user handwriting input, wherein the text comprises the user password; and
determining whether the user password matches the user; and
performing persistent authentication checks upon determining that the request to access content is approved, wherein performing persistent authentication checks comprises periodic sampling of the user's fingerprint and determining second handwriting biometrics based on a second user handwriting input, wherein the second user handwriting input does not comprise the user password.

9. The information handling system of claim 8, wherein the step of determining whether to approve the request for the user to access content further comprises:
determining first handwriting biometrics based on the first user handwriting input; and
determining whether the first handwriting biometrics authenticates the user.

10. The information handling system of claim 8, wherein the step of determining whether to approve the request to access content further comprises:
determining first handwriting biometrics based on the first user handwriting input; and
determining whether the first handwriting biometrics authenticates the user,
wherein the request to access content is approved when each of the user password, the first handwriting biometrics, and the fingerprint token authenticates the user.

11. The information handling system of claim 10, wherein determining whether the fingerprint token matches the user comprises:
decrypting the fingerprint token with a public key to obtain a hash value; and
determining whether the hash value matches an expected hash value for the user,
wherein the hash value is based, at least in part, on a random secret and an identification value for the user,
and wherein the process is further configured to perform steps comprising transmitting to the stylus the random secret prior to receiving the user handwriting input.

12. The information handling system of claim 8, wherein the processor is further configured to perform steps comprising:
approving the request to access content based, at least in part, on determining whether the user password of the recognized text authenticates the user; and
after approving the request, determining whether to terminate the access based on at least one of:
receiving a fingerprint token from a wireless stylus coupled to the information handling system during access to the information handling system that does not match the user; or
determining the second handwriting biometrics does not match the user.

13. The method of claim 1, further comprising:
upon determining that the request to access content is approved, terminating the access based on determining the stylus is not within a proximity of the information handling system;
before a predetermined amount of time after terminating the access based on at least determining the stylus is not within the proximity of the information handling system, determining whether to reauthenticate the user based on whether the stylus is within the proximity of the information handling system; and
after the predetermined amount of time, determining whether to reauthenticate the user based on a third user handwriting input.

14. The information handling system of claim 8, wherein the processor is further configured to perform steps comprising:
upon determining that the request to access content is approved, terminating the access based on determining the stylus is not within a proximity of the information handling system;
before a predetermined amount of time after terminating the access based on at least determining the stylus is not within the proximity of the information handling system, determining whether to reauthenticate the user based on whether the stylus is within the proximity of the information handling system; and after the predetermined amount of time, determining whether to reauthenticate the user based on a third user handwriting input.

\* \* \* \* \*